No. 894,221. PATENTED JULY 28, 1908.
J. MERRITT.
APPARATUS FOR MOUNTING AND DISMOUNTING TUBES AND GASKETS.
APPLICATION FILED DEC. 29, 1906.
2 SHEETS—SHEET 1.
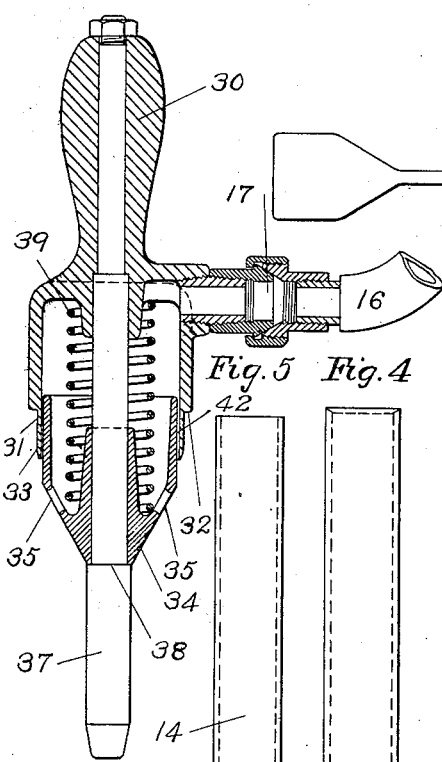
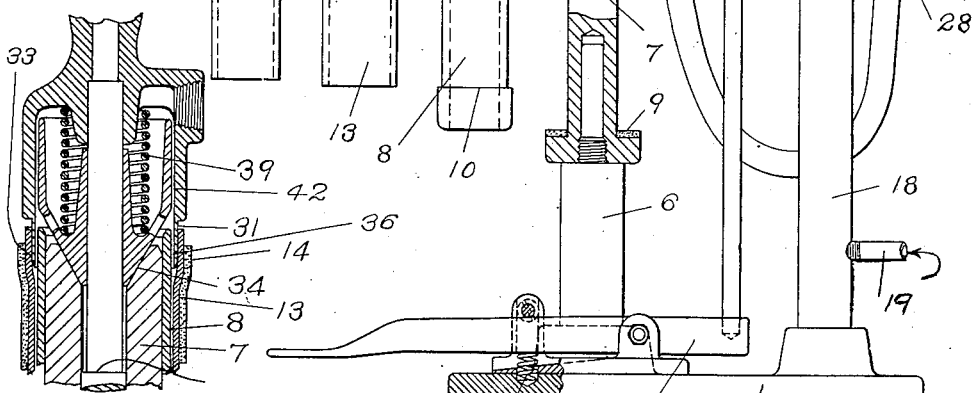
Witnesses:
Inventor:
Joseph Merritt

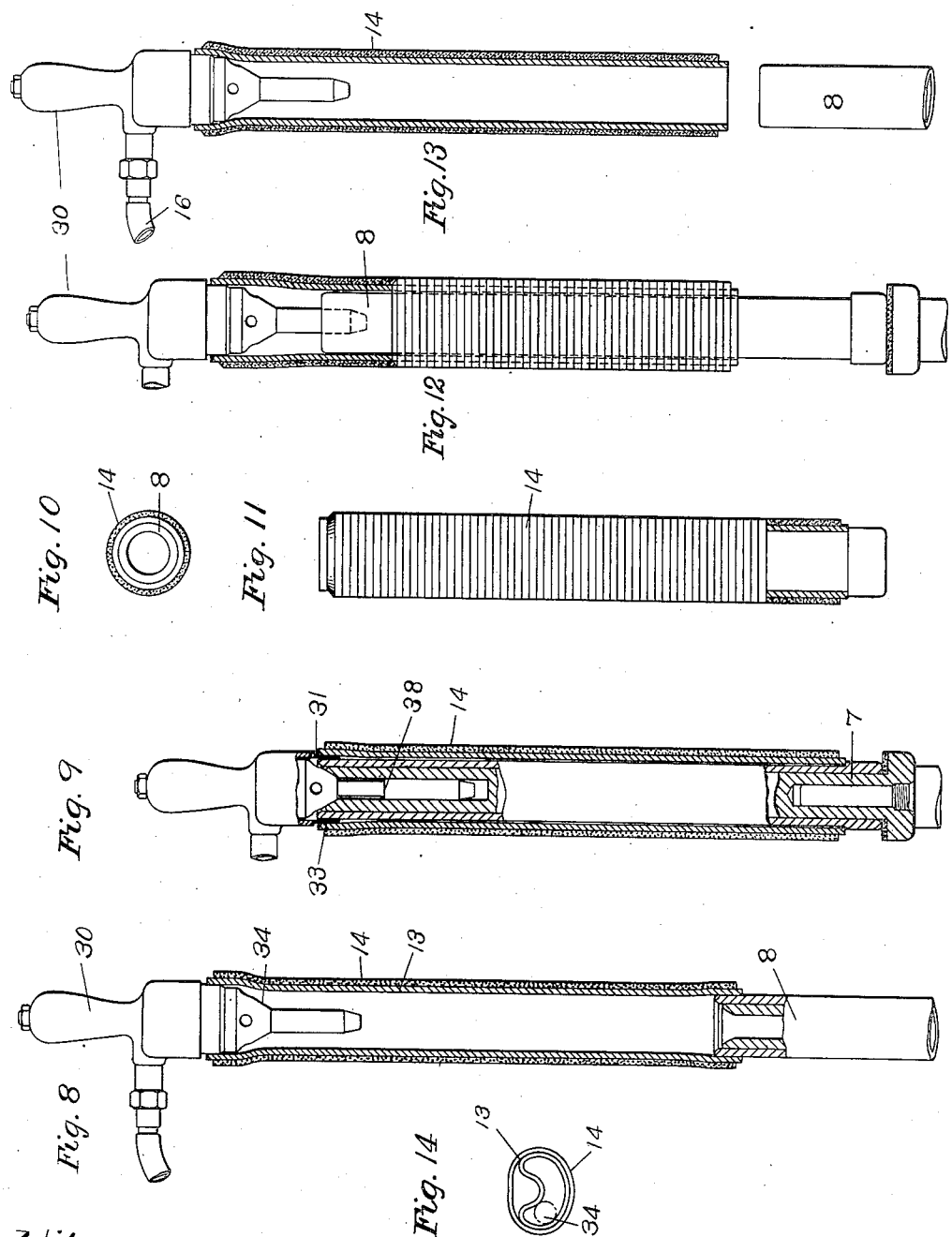

UNITED STATES PATENT OFFICE.

JOSEPH MERRITT, OF HARTFORD, CONNECTICUT, ASSIGNOR OF ONE-HALF TO BEECH-NUT PACKING COMPANY, OF CANAJOHARIE, NEW YORK, A CORPORATION OF NEW YORK, AND ONE-FOURTH TO WILLIAM A. LORENZ AND ONE-FOURTH TO WILLIAM H. HONISS, BOTH OF HARTFORD, CONNECTICUT.

APPARATUS FOR MOUNTING AND DISMOUNTING TUBES AND GASKETS.

No. 894,221.          Specification of Letters Patent.          Patented July 28, 1908.

Application filed December 29, 1906. Serial No. 349,963.

*To all whom it may concern:*

Be it known that I, JOSEPH MERRITT, a citizen of the United States, and resident of Hartford, in the county of Hartford and State of Connecticut, have invented certain new and useful Improvements in Apparatus for Mounting and Dismounting Tubes and Gaskets, of which the following is a full, clear, and exact specification.

This invention relates to improved apparatus for the handling of flexible tubes and flexible gaskets.

The embodiment of this invention herein shown and described is particularly adapted for use in the manufacture of rubber gaskets to be employed in the hermetic sealing of cans, jars, and other receptacles commonly employed for the packing of food products.

Figure 1 of the drawings is a plan view in reduced scale of this improved apparatus. Fig. 2 is a side view partly in section on the line 2—2 of Fig. 1. Fig. 3 is a side view of a form of mandrel adapted for use in this apparatus. Fig. 4 is a side view of a sleeve, preferably made of flexible and elastic material, employed as a lining for the gasket tubes during the cutting operation, and serving as a vehicle for mounting the tubes upon the mandrel of Fig. 3, and for dismounting it therefrom after it has been cut into gaskets. Fig. 5 is a side view of a tube of gasket material adapted for use in connection with the sleeve or lining shown in Fig. 4, and with the mandrel shown in Fig. 3. Fig. 6 is a side view in enlarged scale, and in section taken through its longitudinal center, of the inflating nozzle shown in Fig. 2. In this view the telescoping portion of the nozzle is shown in its extended position. Fig. 7 is a similar view of portions of the nozzle of Fig. 6, showing it in the position which it occupies in delivering a sleeve and a tube of gasket material to a mandrel like that of Fig. 3. Fig. 8 is a side view in reduced scale, of the inflating nozzle, sleeve, gasket, mandrel and support of the previous figures, showing them in position ready for the inflating and pushing on operation. Fig. 9 is a view similar to that of Fig. 8, but showing the parts in the position occupied by them in delivering the sleeve and tube in final position upon the mandrel. In Figs. 8 and 9 some portions of the parts are shown in section taken through their longitudinal center. Fig. 10 is an end view, and Fig. 11 a side view of the mandrel of the preceding figures, with a sleeve and gasket mounted thereon, and with the tube separated into gaskets. Figs. 12 and 13 are side views, illustrating the operation of removing the sleeve with its cut gaskets thereon from the mandrel. In Fig. 12 the sleeve and gaskets are drawn part way from the mandrel and in Fig. 13 they are shown as being fully withdrawn therefrom. Fig. 14 is an end view, showing the assembled sleeve and tube, and showing how the pilot member of the inflating nozzle may be utilized in entering the nozzle in the collapsed tube.

This improved apparatus herein shown and described is adapted to perform an intermediate operation in the manufacture of rubber gaskets from tubes of gasket material, like the tube 14 shown in the figures. By the methods of manufacture to which the present invention relates, these tubes are mounted upon mandrels which are then mounted for rotation upon centers or upon a spindle while the gaskets are cut from the tube by a succession of circumferential cuts penetrating the wall of the tube, either at right angles with its axis, when making gaskets having a rectangular cross-section, or at an angle with that axis in making acute angled gaskets. The constrictive action of the tube due to its elasticity is utilized by pushing or pulling it over a mandrel of a diameter larger than the normal diameter of the tube. This mounting operation involves obvious difficulties, due to the flexible elastic and clinging character of the gasket material. The constrictive action of the tube around the mandrel surface interferes with the free distribution of the material and holds it in a more or less unequally distributed condition while being cut, with the result that the material more or less unequally changes its form as the strains are released by the cutting away of the successive rings, thereby producing gaskets that are irregular in size or contour. Moreover, on account of the clinging and elastic character of the gasket material, it is necessary to have the gasket cutting tool, which is extremely thin and sharp, entirely penetrate the wall of the tube in order to insure complete separation of all the gaskets, thus bringing the cutting edge of the tool against or into the surface of the mandrel, and the repeated cuts of the tool score and roughen that surface, thereby increasing the difficulty of drawing or pushing or otherwise mounting the gasket tubes thereon. This roughness, and the clinging character of the gasket material, also interfere materially with the expeditious removal of the cut rings from the mandrel. Any attempt to remove the cut gaskets wholesale or several at a time from the mandrel is resisted by the clinging action of the several gaskets, each acting independently; and their resistance is still greater when of the acute angled form shown herein, because of the fact that their interlapping conical faces tend to telescope and wedge each other when attempts are made to push them longitudinally of the material.

The method of manufacture to which the apparatus of the present invention is adjunctive, avoids these difficulties by employing a flexible sleeve or lining, which is made removable from the mandrel, and serves as a vehicle for the tube and the cut gaskets. The tube and its sleeve are first assembled apart from the mandrel, preferably by apparatus, which however, forms no part of the present invention. Then the removable tube and its sleeve are expanded and settled uniformly upon the mandrel by the apparatus of the present invention. Then the tubes are separated into gaskets by still other apparatus. Then the sleeves with the cut gaskets thereon are bodily removed from the mandrel, by the use of the apparatus of the present invention. Then the cut gaskets are removed from the sleeve, the latter being preferably collapsed to release the gaskets.

The various parts of the present apparatus are herein shown as being mounted upon a base plate 5, which is provided with suitable standards or posts for receiving and supporting the various parts at the desired height, according to the lengths of the tubes to be cut; and to suit the height of the operator. The mandrel support is preferably made in two pieces to facilitate removal or adjustment, or the substitution of other supports for different sizes or lengths of mandrels. The base portion 6 of the support is preferably threaded to receive the upper portion 7, which is of a size suitable for receiving the mandrels 8, as shown in Figs. 8 and 12. The mandrel support is preferably provided with a washer or collar 9 of rubber or other soft material, to enable the mandrel 8 to be dropped in place on the support without bruising the parts, and to serve also as a gasket to prevent the escape of the air pressure through the inside of hollow mandrels. The mandrel 8 is preferably made with a shoulder 10 to receive and locate the end of the sleeve or lining 13 for the gasket tubes 14. The gasket tube, sleeve, mandrel and support when assembled occupy the relative positions shown in Fig. 9.

The sizes of the gasket tube, sleeve and mandrel may and should be varied to suit different conditions, the relative sizes shown herein being those which I have found to be effective for high grade rubber gaskets.

In the use of the present apparatus, the assembled gasket tube and sleeve are expanded by inflation to a size which permits them to pass upon the mandrel 8. One end of the sleeve, with the tube mounted thereon is closed by slipping it upon the upper end of the mandrel, as shown in Fig. 7. The upper end of the sleeve, which is preferably beveled as at 41, is similarly closed by means of an inflating nozzle connected with a supply of air pressure. In the present preferred embodiment as herein shown, the inflating nozzle is portable in the sense that it can be freely moved about by the operator, being provided with a handle; and made light and convenient in form for handling. The nozzle is provided with a flexible tube 16, attached by means of a union joint or coupling 17, or in any well-known way. The other end of the tube 17 is connected with the tubular standard 18, which is supported by the base plate 5; and is provided with the inlet 19, by means of which a constant supply of air pressure is conveyed through the interior of the standard and the flexible pipe 16 to the inflating nozzle.

In order to enable the operator to shut off and turn on the air pressure whenever desired, a valve is provided in any convenient portion of the apparatus. In the present instance the valve 21, which may be of well-known construction, is located near the top of the tubular standard 18. Valves of this class are held in a closed position by the internal pressure, aided if necessary by an internal spring; and are opened by means of a valve stem 22. In the present instances this stem is operated by means of a connecting rod 23, extending to a treadle 24, mounted upon the base plate 5, in convenient relation to the foot of the operator. A spring 25 is also preferably employed to over-balance and return the treadle and lower the rod 23 away from the valve stem, to permit the valve to close promptly.

As shown in Fig. 2, the standard 18 is provided with an adjustable bracket 28, for supporting the nozzle between the inflating operations. The adjustment of the bracket 28 permits the nozzle to be supported on any side of the standard, or at any height that may be most convenient for the operator.

The inflating nozzle as herein shown is provided with a handle 30, which is preferably central over the main body of the nozzle, so as to balance the tool conveniently for handling. The thin nozzle is also provided with a thin annular lip 33, the outside of which forms a receiving seat 31 for the upper ends of the sleeves. The inner diameter of the lip is slightly larger than the mandrel 8, so that it will slip freely over the mandrel and leave an annular space 36 for the air to enter between the sleeve and the mandrel. The lip 33 is thin, so as to enter readily between the mandrel and the sleeve, as shown in Figs. 7 and 9 in delivering the end of the sleeve upon the mandrel, and more especially in removing the sleeve from the mandrel. The seat 31 preferably terminates in a shoulder 32, which serves when required, to prevent the end of the sleeve from pushing too far upon the nozzle.

To facilitate entering the nozzle in the upper end of the collapsed or contracted sleeves 13, the nozzle is preferably provided with a conical entering member 34, which is preferably made separate from the portion containing the seat 31; and is mounted for telescoping movement inside of the seat or annular lip 33, as best shown in Figs. 6 and 9, in order to get the entering member out of the way of the end of the mandrel, and enable the nozzle to deliver the sleeve and gasket tube fully to its desired place upon the mandrel, as illustrated in Figs. 7 and 9.

The inflating nozzle is provided with suitable air outlets, herein shown to consist of the apertures 35, located in the conical portion of the entering member 34, and of the annular space 42 around that member and between it and the body portion of the nozzle inside of which it slides in its telescoping movement, as best shown by Figs. 6 and 7. These outlets should be located where they are not covered by the sleeve or by the mandrel at any portion of the operation; and should be so located relative to the end of the mandrel when in the position shown in Fig. 9 as to direct the flow of air between the outside of the mandrel and the inside of the sleeve through the annular space 36.

To facilitate guiding the nozzle into proper central relation to the end of the mandrel as the nozzle and the mandrel approach the position shown in Figs. 7 and 9, and while separating from that position as shown in Fig. 12, the inflating nozzle is provided with a pilot member 37, which preferably consists of a shaft or rod, the upper end of which is fixed in the handle 30 of the instrument. In the present construction this pilot member serves as the support for the telescoping conical entering member 34, and serves also by means of the shoulder 38 as a stop for the extended position of that member, which is yieldingly held against the shoulder 38 by means of a spring 39, the opposite end of which is seated against the handle portion of the nozzle. The pilot member 37 also serves as a convenient means of engagement with the supporting bracket 28, as shown in Fig. 2.

The sleeve 13 is preferably made somewhat longer than the tube, as shown by comparison of Figs. 4 and 5. This leaves the ends of the sleeve more free and flexible for the mounting and dismounting operations; and also leaves a margin beyond the end of the tube, to allow of variations in placing the successive tubes upon the sleeve.

The operation of this device in mounting a gasket tube like the tube 14 and a sleeve like the sleeve 13 upon a mandrel like the mandrel 8 is as follows:—The tube and its sleeve are first assembled with the sleeve inside of the tube, preferably by contracting, coiling, twisting, or otherwise collapsing the sleeve, so that it will readily pass inside of the tube. The mandrel 8 is placed upon its support 7 with its lower end resting upon the cushioning gasket-collar 9. The lower end of the sleeve is then stretched over the upper end of the mandrel 8; and the inflating nozzle is inserted in the upper end of the tube, as shown in Fig. 8, thus closing both ends of the sleeve. Air pressure is now admitted through the nozzle and passing through the discharge openings 35 or 42, or both of them, to the interior of the sleeve, the latter is expanded by inflation, so that it will pass freely over the mandrel 8, upon which it is then pushed by a following movement of the inflating nozzle. The compressed air escaping between the sleeve and the mandrel assists in the mounting operation by interposing a separating film of air, thus avoiding the holding back influence that would result from frictional contact between the sleeve and the mandrel. As the upper end of the tube approaches the end of the mandrel, its pilot end 37 enters the mandrel or the mandrel support, as the case may be, thus guiding and centering the inflating tool and the sleeve with the mandrel, so as to center the upper end of the sleeve, and particularly the annular lip 33 with the mandrel. Still nearer the end of the stroke the conical surface of the entering member 34 seats against the upper end of the mandrel or the mandrel support. Then begins the telescoping movement of the conical member from the position shown in Fig. 6 to that shown in Fig. 7, which permits the annular lip 33 of the nozzle, carrying the upper end of the sleeve, to continue its downward movement over the end of the mandrel, so as to deliver the end of the tube and sleeve entirely upon the mandrel, to the position shown in Figs. 7 and 9. The air pressure is then shut off from the inflating nozzle, and the latter is withdrawn from the end of the tube, the spring 39 serving then to extend the nozzle, sliding the telescoping member 34 to its extended position shown in Fig. 6. The mandrel, with the sleeve and gasket mounted thereon, may then be removed from the support 7 and be placed in any suitable apparatus for cutting the gasket tube into gaskets of the required size, as represented in Fig. 11, after which the mandrel and sleeve still carrying the cut gaskets, are placed again upon the mandrel support; and the inflating nozzle inserted to the position shown in Fig. 9. In inserting the nozzle it is guided by its pilot portion centrally with the mandrel and sleeve, so that the thin annular lip of the nozzle will enter between the sleeve and the mandrel. Air pressure is then admitted, thereby again inflating the sleeve and expanding it enough to enable it to be removed bodily from the mandrel, carrying the cut gaskets with it, as shown in Figs. 12 and 13. The inflating nozzle is then removed, and the sleeve 13 contracted or collapsed, which releases the gaskets so that they may be readily removed, or may be dropped off in a heap by turning the sleeve on end.

The shoulder 32 above the seat portion is not considered essential, although it may sometimes be useful in preventing the end of a sleeve from sliding upwardly too far upon the nozzle. In general, it will be found advisable for the operator to clasp the upper end of his tube with his hand, so as to hold it tightly against its seat on the inflating tool and prevent the escape of air at that end, and particularly so when withdrawing the tube as shown in Fig. 12, so as to avoid withdrawing the nozzle from the sleeve before the latter is free from the mandrel.

In Fig. 14 is shown a tube and sleeve assembled ready for the inflating operation, and illustrating how the pilot member 34 of the inflating nozzle may be utilized in entering the nozzle in the collapsed sleeve, preliminary to the inflating operation.

Although this apparatus is herein shown and described as being applied to the manufacture of gaskets it is obvious that it may also be employed for other purposes which involve the mounting or dismounting of sleeves or tubes of flexible material. The apparatus may be modified in many ways both in general and in detail, to adapt it to different purposes. For example, the nozzle may be made to center in the mandrel itself, instead of centering in the support. The form and location of the air controlling valve may also be changed in many ways. For example, a valve of suitable form may be located in the inflating nozzle itself; and be operated by the finger or thumb of the operator, instead of being operated by the foot. The various members of the apparatus may also be altered in relative position; and may be reversed or inverted or extend horizontally instead of vertically. In many other ways which will suggest themselves to those familiar with this art, the apparatus may be modified to suit different purposes.

I claim as my invention:—

1. The combination in apparatus for mounting flexible tubes on a mandrel, of a flexible sleeve and a portable inflating nozzle having a flexible connection with a supply of air pressure.

2. The combination in apparatus for mounting flexible tubes on a mandrel, of a flexible sleeve, a mandrel support and a portable inflating nozzle connected by a flexible tube with a supply of air pressure.

3. The combination in apparatus for mounting flexible tubes on mandrels, of a flexible sleeve, a mandrel support, a portable inflating nozzle having a flexible connection with a supply of air pressure, and a valve worked by the operator for controlling the flow of air to the nozzle.

4. In apparatus for mounting flexible tubes on mandrels, the combination of a support for holding mandrels of different sizes, a flexible sleeve, a portable inflating nozzle having a flexible connection with a supply of air pressure, and a valve controlled by the operator for admitting air pressure through the nozzle.

5. The combination in apparatus for mounting flexible tubes on mandrels, of means for supporting different mandrels, a flexible sleeve, an inflating nozzle having a flexible connection with a supply of air pressure, a valve for admitting the air pressure through the nozzle under the control of the operator, and adjustable means for supporting the inflating nozzle in convenient relation to the operator.

6. The combination in apparatus for mounting flexible tubes on mandrels, of means for supporting a mandrel, a flexible sleeve, a manually operated inflating nozzle connected with a supply of air pressure, and a foot operated valve for controlling the admission of air through the nozzle.

7. The combination in apparatus for mounting flexible tubes on mandrels, of means for supporting a succession of mandrels in position for receiving the tubes, a portable inflating nozzle connected by means of a flexible tube with a supply of air pressure, a valve for admitting the air pressure through the nozzle under the control of the operator, and an adjustable support for holding the inflating nozzle in convenient relation to the operator.

8. In apparatus for inflating tubes, the combination of an inflating nozzle having a conical nose to facilitate entering the tube, provided with air pressure outlets in its conical surface connected with a supply of air pressure.

9. In apparatus for inflating flexible tubes, the combination of an inflating nozzle, provided with a tapering portion to facilitate entrance into the tube, and with an annular lip to receive the end of the tube thus entered.

10. In apparatus for inflating flexible tubes, the combination of an inflating nozzle, provided with a conical portion to facilitate entering the tubes, and with a substantially parallel portion for receiving the ends of the tubes thus entered, the conical portion being mounted to telescope within the said parallel portion.

11. In apparatus for inflating flexible tubes, the combination of an inflating nozzle provided with a tapering portion for entering the tube, and with a substantially parallel portion for receiving the ends of the tubes thus entered, the tapering portion being mounted to telescope longitudinally within the said parallel portion, and a spring for yieldingly holding the telescoping members in their extended position.

12. In apparatus for inflating flexible tubes, the combination of an inflating nozzle, provided with a tapering portion for entering the tube, and with a substantially parallel portion for receiving the ends of the tubes thus entered, the tapering portion being mounted to telescope longitudinally within the said parallel portion, a spring for yieldingly holding the telescoping members in their extended position, and a stop for limiting the extension of the telescoping members.

13. In apparatus for mounting flexible tubes upon mandrels the combination of an inflating nozzle, having a tapering portion, for entering the tube, and a pilot portion extending in advance of the said tapering portion for entering the mandrel to guide the nozzle centrally with the mandrel.

14. In apparatus for mounting flexible tubes on mandrels, the combination of a mandrel support, an inflating nozzle for receiving and substantially closing one end of the tube, and means for centering the nozzle with the mandrel as these two members approach each other.

15. In apparatus for mounting flexible tubes upon mandrels the combination of a mandrel support, a flexible sleeve, an inflating nozzle for receiving and substantially closing one end of the sleeve, and means for centering the nozzle with the mandrel, as these two members approach each other.

16. In apparatus for mounting flexible tubes on mandrels, the combination of a mandrel support, an inflating nozzle provided with means for receiving and substantially closing the end of the tube and having a pilot portion projecting in advance of the inflation outlets of the nozzle for centering the nozzle with the mandrel support, as these two members approach each other.

17. In apparatus for mounting flexible tubes upon mandrels, the combination of a mandrel support, an inflating nozzle having an annular lip for receiving the end of the tube and provided with a conical guiding portion in advance of the said lip.

18. In apparatus for mounting flexible tubes upon mandrels, the combination with a mandrel support, of an inflating nozzle provided with a seat for receiving the end of the tube, and having a conical guiding portion mounted to telescope within the said seat, and having a spring for yieldingly holding the telescoping guiding portion in its extended position in advance of said seat.

19. In apparatus for mounting flexible tubes upon mandrels, the combination with a mandrel, of an inflating nozzle having a receiving seat for the end of the tube, and having a conical guiding member mounted for telescoping movement within the said seat, a pilot portion projecting beyond the conical entering member, and a spring for yieldingly holding the conical entering member in its extended position.

20. In apparatus for mounting flexible tubes upon mandrels, the combination with a mandrel for entering and substantially closing one end of the tube, of an inflating nozzle provided with a receiving seat for receiving the opposite end of the tube, and with a pilot portion for guiding the nozzle in central relation to the mandrel, as the nozzle and the mandrel approach each other, a conical entering member mounted upon the pilot for telescoping movement within the receiving seat, and a spring for normally holding the said entering portion in its extended position.

21. In apparatus for mounting flexible tubes upon mandrels, the combination with a mandrel for entering and substantially closing one end of the tube, of an inflating nozzle provided with a receiving seat for receiving the opposite end of the tube, and with a pilot portion for guiding the nozzle in central relation to the mandrel as the nozzle and the mandrel approach and recede from each other, a conical entering member mounted upon the pilot for telescoping movement within the receiving seat, and a spring for normally holding the said entering portion in its extended position, the pilot being provided with a shoulder for stopping the said entering portion in its extended position.

22. The combination in apparatus of the class specified, of a mandrel, a flexible sleeve and an inflating nozzle having a thin annular lip for entering between the end of the sleeve and the mandrel, and forming a receiving seat for the end of the sleeve.

23. The combination in apparatus of the class specified, of a mandrel, a flexible sleeve and an inflating nozzle having a thin annular lip for insertion between the end of the sleeve and the mandrel, and having a pilot portion for registering the said annular lip with the mandrel.

24. The combination in apparatus of the class specified, of a mandrel, a flexible sleeve and a portable inflating nozzle provided with a thin annular lip for entering between the end of the sleeve and the mandrel, and forming a receiving seat for the sleeve, the nozzle being provided with a flexible connection with a supply of air pressure, and with a pilot portion for registering the said lip with the mandrel.

25. Means for mounting flexible gasket tubes and dismounting the cut gaskets, including in combination a mandrel, and a removable flexible tube.

26. Means for mounting gasket tubes for cutting, and subsequently removing the cut gaskets, including in combination a mandrel, and a removable flexible sleeve.

27. Means for mounting tubes of gasket material for cutting, and subsequently dismounting the cut gaskets, including in combination a mandrel, a removable flexible tube serving as a vehicle for the gasket tube and gaskets, and means for expanding the sleeve and the tube to place them together upon the mandrel, and for removal from the mandrel.

In testimony whereof I have signed my name to this specification in the presence of two subscribing witnesses.

JOSEPH MERRITT.

Witnesses:
NELLIE PHOENIX,
CAROLINE M. BRECKLE.